United States Patent
Cariello

(10) Patent No.: US 11,657,185 B2
(45) Date of Patent: *May 23, 2023

(54) MEMORY ACCESS GATE

(71) Applicant: Micron Technology, Inc., Boise, ID (US)

(72) Inventor: Giuseppe Cariello, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/559,484

(22) Filed: Dec. 22, 2021

(65) Prior Publication Data

US 2022/0188466 A1 Jun. 16, 2022

Related U.S. Application Data

(63) Continuation of application No. 16/814,013, filed on Mar. 10, 2020, now Pat. No. 11,210,429.

(51) Int. Cl.
*G06F 21/74* (2013.01)
*G06F 12/0802* (2016.01)
(Continued)

(52) U.S. Cl.
CPC .......... *G06F 21/74* (2013.01); *G06F 12/0802* (2013.01); *G06F 12/14* (2013.01); *G06F 21/30* (2013.01)

(58) Field of Classification Search
CPC ...... G06F 21/74; G06F 12/0802; G06F 12/14; G06F 21/30
(Continued)

(56) References Cited

U.S. PATENT DOCUMENTS

2009/0198879 A1* 8/2009 Tanaka ................ G06F 13/1673
711/E12.008
2013/0138868 A1* 5/2013 Seroff ................... G06F 3/0634
711/E12.008
(Continued)

FOREIGN PATENT DOCUMENTS

| CN | 110289030 A | 9/2019 |
|---|---|---|
| EP | 1463021 A2 | 9/2004 |
| KR | 100733449 B1 | 6/2007 |

OTHER PUBLICATIONS

China National Intellectual Property Administration, "First Office Action," issued in connection with Chinese Patent Application No. 202110256125.0, dated Jan. 24, 2022 (4 pages).

*Primary Examiner* — Edward J Dudek, Jr.
*Assistant Examiner* — Sidney Li
(74) *Attorney, Agent, or Firm* — Holland & Hart LLP

(57) ABSTRACT

Methods, systems, and devices for a memory access gate are described. A memory device may include a controller, memory dice, and a pad for receiving an externally provided control signal, such as a chip enable signal. The memory device may include a switching component for selecting the externally provided control signal or an internally generated control signal. The controller may provide the selected control signal to a memory die. The memory device may determine whether it is operating in a first mode or a second mode, and select the externally provided control signal or the internally generated control signal based on the determination. The first mode may be a diagnostic mode in some cases. The controller may include a secure register whose value may impact or control the switching. An authenticated host device may direct the controller to write the value to the secure register.

20 Claims, 6 Drawing Sheets

(51) Int. Cl.
    *G06F 12/14*    (2006.01)
    *G06F 21/30*    (2013.01)
    *G06F 21/79*    (2013.01)
    *G11C 5/06*     (2006.01)
    *G06F 13/16*    (2006.01)
    *G11C 16/04*    (2006.01)

(58) Field of Classification Search
    USPC .......................................................... 711/147
    See application file for complete search history.

(56) References Cited

U.S. PATENT DOCUMENTS

2015/0236694 A1* 8/2015 Oh ........................ G11C 16/26
                                                    326/30
2018/0254079 A1* 9/2018 Cox .................... G06F 11/1068

\* cited by examiner

MEMORY ACCESS GATE

CROSS REFERENCE

The present Application for Patent is a continuation of U.S. patent application Ser. No. 16/814,013 by Cariello, entitled "MEMORY ACCESS GATE," filed Mar. 10, 2020, assigned to the assignee hereof, and is expressly incorporated by reference in its entirety herein.

BACKGROUND

The following relates generally to one or more memory systems and more specifically to a memory access gate.

Memory devices are widely used to store information in various electronic devices such as computers, wireless communication devices, cameras, digital displays, and the like. Information is stored by programing memory cells within a memory device to various states. For example, binary memory cells may be programmed to one of two supported states, often denoted by a logic 1 or a logic 0. In some examples, a single memory cell may support more than two states, any one of which may be stored. To access the stored information, a component may read, or sense, at least one stored state in the memory device. To store information, a component may write, or program, the state in the memory device.

Various types of memory devices exist, including magnetic hard disks, random access memory (RAM), read only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), 3-dimensional cross-point memory (3D Xpoint), Flash memory (such as floating-gate Flash and charge-trapping Flash, which may be used in not-or (NOR) or not-and (NAND) memory devices), and others. Memory devices may be volatile or non-volatile. Non-volatile memory cells, e.g., such as flash memory cells, may maintain their stored logic state for extended periods of time even in the absence of an external power source. Volatile memory cells, e.g., DRAM cells, may lose their stored state over time unless they are periodically refreshed by an external power source. Flash-based memory devices may have different performance compared to other non-volatile and volatile memory devices.

DETAILED DESCRIPTION

Figure 1:
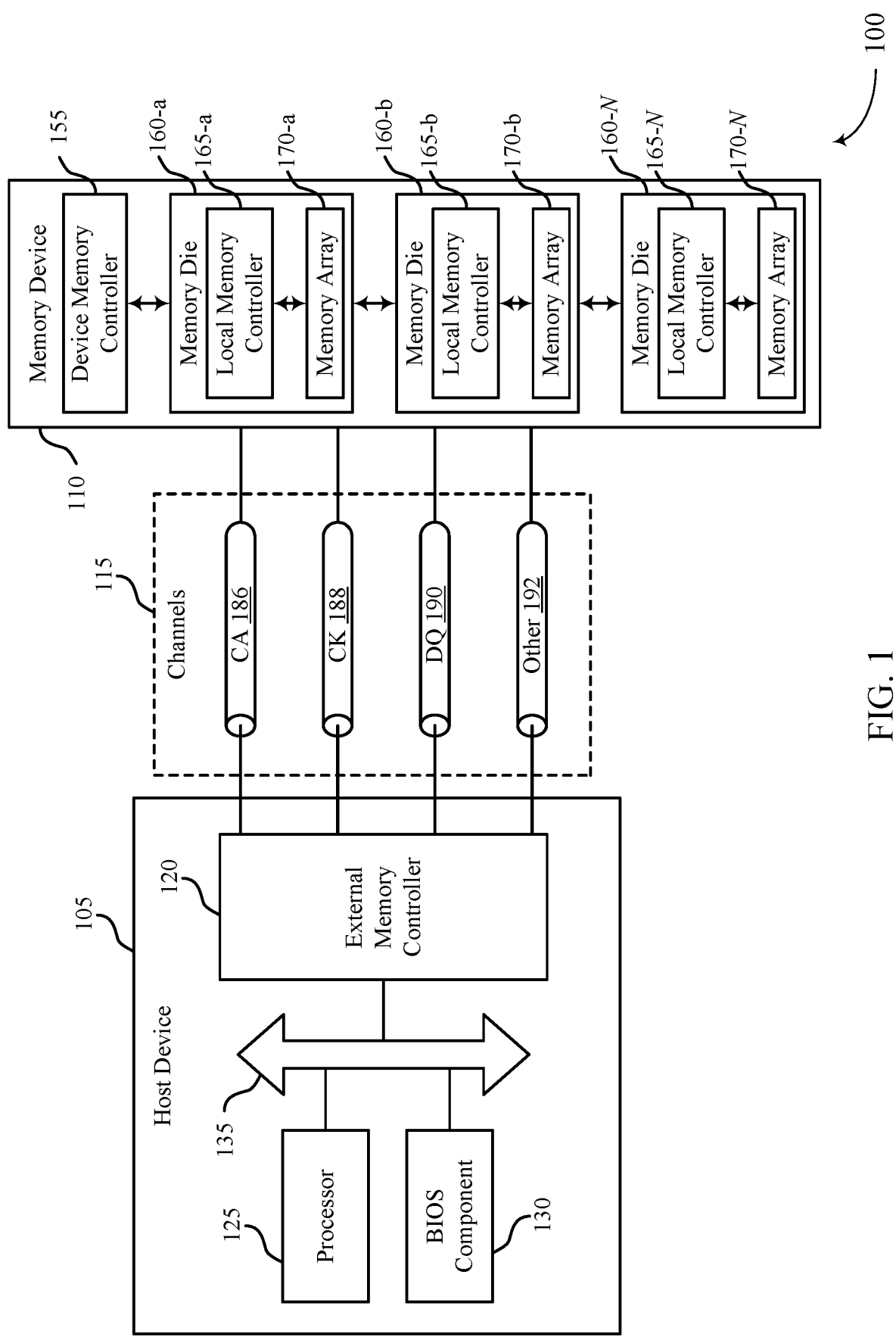
FIG. 1 illustrates an example of a system that supports a memory access gate in accordance with examples as disclosed herein.

A managed memory device may be an integrated circuit package or chip that includes a controller coupled with one or more memory dice. The controller may, among other tasks, manage accesses to the memory dies and generate various signals for accessing the memory dice, including chip enable signals, write enable signals, control signals, or other signals. A managed memory device may perform various diagnostic procedures to verify operation of the managed memory device. To support such diagnostic procedures, a managed memory device may include one or more pads (e.g., test pads) that may be coupled with the memory dice and may be accessed by an external device to provide test inputs and observe resulting outputs.

In some cases, a managed memory device may include features that allow the controller to be bypassed during one or more procedures, for example diagnostic procedures, such as by disabling the controller's one or more drivers. For example, a managed memory device may include a pad, sometimes referred to as a "HiZ" pad, that may be set to force a high-impedance state onto the controller's buffer and let it should be bypassed. In some cases, however, inclusion of features to support various procedures like diagnostic procedures, such as the inclusion of test pads that are coupled with memory dice, may result in a managed memory device being vulnerable to unwanted or unauthorized accesses of the memory dice via the test pads. For example, an unauthorized device may use the test pads to directly activate and access memory dice in the managed memory device.

Some managed memory devices may implement firmware-based security measures to counteract potential unauthorized accesses, such as by encrypting information in the memory dice. This approach, however, may result in slower memory access times and possibly higher costs due to the processing overhead involved in encrypting and decrypting information.

As described herein, to improve security without introducing unwanted overhead, a managed memory device may support techniques for blocking (e.g., "gating") access to the memory dice in the managed memory device. For example, a managed memory device may include features that may allow one or more memory control signals, such as a chip enable signal or a write enable signal, to be routed through the controller so that the controller can enforce security protocols for memory accesses.

For example, a managed memory device may include a pad for receiving an external chip enable signal (e.g., from an external device, such as a host device) that may be used to control accesses to one or more of the memory dice in the managed memory device during a diagnostic procedure. The externally provided chip enable signal may be routed to the controller rather than directly routed to a memory die. The controller may be configured to select between the externally provided chip enable signal and an internally generated chip enable signal based on whether the managed memory device is operating in one mode or another, for example, a normal operational mode or a diagnostic mode. The controller may determine which chip enable signal to select based on the value of a register, such as a secure register, that may be written by the host device after the host device has been authenticated by the controller.

In some examples, the controller may include a switching component for switching between the chip enable signals. The switching component may, in some examples, include one or more physical switches, such as multiplexers, with each multiplexer corresponding to a memory die in the managed memory device. The secure register may be coupled with the multiplexers to control selection of the chip enable signals. For example, each multiplexer may be configured to receive an externally provided chip enable signal as one input and an internally generated chip enable signal as another input, and may provide either the externally provided chip enable signal or the controller-generated chip-enable signal to the corresponding memory die depending on the value of the secure register. These techniques and devices may yield advantages as further described herein.

Features of the disclosure are initially described in the context of memory systems, memory dice, and memory circuitry as described with reference to FIGS. 1 through 3. Features of the disclosure are described in the context a memory system that includes a managed memory device as described with reference to FIG. 4. These and other features of the disclosure are further illustrated by and described with reference to an apparatus diagram and a flowchart that relate to a memory access gate as described with reference to FIGS. 5 and 6.

FIG. 1 illustrates an example of a system 100 that supports a memory access gate in accordance with examples as disclosed herein. The system 100 may include a host device 105, a memory device 110, and a plurality of channels 115 coupling the host device 105 with the memory device 110. The system 100 may include one or more memory devices 110, but aspects of the one or more memory devices 110 may be described in the context of a single memory device (e.g., memory device 110).

The system 100 may include portions of an electronic device, such as a computing device, a mobile computing device, a wireless device, a graphics processing device, a vehicle, or other systems. For example, the system 100 may illustrate aspects of a computer, a laptop computer, a tablet computer, a smartphone, a cellular phone, a wearable device, an internet-connected device, a vehicle controller, or the like. The memory device 110 may be a component of the system operable to store data for one or more other components of the system 100.

At least portions of the system 100 may be examples of the host device 105. The host device 105 may be an example of a processor or other circuitry within a device that uses memory to execute processes, such as within a computing device, a mobile computing device, a wireless device, a graphics processing device, a computer, a laptop computer, a tablet computer, a smartphone, a cellular phone, a wearable device, an internet-connected device, a vehicle controller, or some other stationary or portable electronic device, among other examples. In some examples, the host device 105 may refer to the hardware, firmware, software, or a combination thereof that implements the functions of an external memory controller 120. In some examples, the external memory controller 120 may be referred to as a host or a host device 105.

A memory device 110 may be an independent device or a component that is operable to provide physical memory addresses/space that may be used or referenced by the system 100. In some examples, a memory device 110 may be configurable to work with one or more different types of host devices. Signaling between the host device 105 and the memory device 110 may be operable to support one or more of: modulation schemes to modulate the signals, various pin configurations for communicating the signals, various form factors for physical packaging of the host device 105 and the memory device 110, clock signaling and synchronization between the host device 105 and the memory device 110, timing conventions, or other factors.

The memory device 110 may be operable to store data for the components of the host device 105. In some examples, the memory device 110 may act as a slave-type device to the host device 105 (e.g., responding to and executing commands provided by the host device 105 through the external memory controller 120). Such commands may include one or more of a write command for a write operation, a read command for a read operation, a refresh command for a refresh operation, or other commands.

The host device 105 may include one or more of an external memory controller 120, a processor 125, a basic input/output system (BIOS) component 130, or other components such as one or more peripheral components or one or more input/output controllers. The components of host device may be in coupled with one another using a bus 135.

The processor 125 may be operable to provide control or other functionality for at least portions of the system 100 or at least portions of the host device 105. The processor 125 may be a general-purpose processor, a digital signal processor (DSP), an application-specific integrated circuit (ASIC), a field-programmable gate array (FPGA) or other programmable logic device, discrete gate or transistor logic, discrete hardware components, or a combination of these components. In such examples, the processor 125 may be an example of a central processing unit (CPU), a graphics processing unit (GPU), a general purpose GPU (GPGPU), or a system on a chip (SoC), among other examples. In some examples, the external memory controller 120 may be implemented by or be a part of the processor 125.

The BIOS component 130 may be a software component that includes a BIOS operated as firmware, which may initialize and run various hardware components of the system 100 or the host device 105. The BIOS component 130 may also manage data flow between the processor 125 and the various components of the system 100 or the host device 105. The BIOS component 130 may include a program or software stored in one or more of read-only memory (ROM), flash memory, or other non-volatile memory.

The memory device 110 may include a device memory controller 155 and one or more memory dies 160 (e.g., memory chips) to support a desired capacity or a specified capacity for data storage. Each memory die 160 may include a local memory controller 165 (e.g., local memory controller 165-$a$, local memory controller 165-$b$, local memory controller 165-N) and a memory array 170 (e.g., memory array 170-$a$, memory array 170-$b$, memory array 170-N). A memory array 170 may be a collection (e.g., one or more grids, one or more banks, one or more tiles, one or more sections) of memory cells, with each memory cell being operable to store at least one bit of data. A memory array 170 may include, for example, DRAM memory cells, Flash-based memory cells (such as in a NAND memory die), FeRAM memory cells, or other types of memory cells.

A memory device 110 including two or more memory dies 160 may be referred to as a multi-die memory, a multi-die package, a multi-chip memory, or a multi-chip package. A memory device 110 that includes a device memory controller 155 and one or more memory dice 160, such as shown in FIG. 1, may be referred to as a managed memory device or managed memory package.

The device memory controller 155 may include circuits, logic, or components operable to control operation of the memory device 110. The device memory controller 155 may include the hardware, the firmware, or the instructions that enable the memory device 110 to perform various operations and may be operable to receive, transmit, or execute commands, data, or control information related to the components of the memory device 110. The device memory controller 155 may be operable to communicate with one or more of the external memory controller 120, the one or more memory dies 160, or the processor 125. In some examples, the device memory controller 155 may control operation of the memory device 110 described herein in conjunction with the local memory controller 165 of the memory die 160.

In some examples, a memory device 110 may include one or more pads for communicating signals with a host device 105 during a diagnostic procedure, as described in more detail with reference to FIG. 4.

In some examples, the memory device 110 may receive data or commands or both from the host device 105. For example, the memory device 110 may receive a write command indicating that the memory device 110 is to store data for the host device 105 or a read command indicating that the memory device 110 is to provide data stored in a memory die 160 to the host device 105.

In some examples, the memory device 110 may be operable to cryptographically authenticate the host device 105 and to receive a command from the host device 105 to store a value in a secure register that may be used for selecting a memory control signal, such as a chip enable signal. The memory device 110 may write the value to the secure register based on receiving the command from the authenticated host device 105.

A local memory controller 165 (e.g., local to a memory die 160) may be operable to control operation of the memory die 160. In some examples, a local memory controller 165 may be operable to communicate (e.g., receive or transmit data or commands or both) with the device memory controller 155. In some examples, a memory device 110 may not include a device memory controller 155, and a local memory controller 165, or the external memory controller 120 may perform various functions described herein. As such, a local memory controller 165 may be operable to communicate with the device memory controller 155, with other local memory controllers 165, or directly with the external memory controller 120, or the processor 125, or a combination thereof. Examples of components that may be included in the device memory controller 155 or the local memory controllers 165 or both may include receivers for receiving signals (e.g., from the external memory controller 120), transmitters for transmitting signals (e.g., to the external memory controller 120), decoders for decoding or demodulating received signals, encoders for encoding or modulating signals to be transmitted, or various other circuits or controllers operable for supporting described operations of the device memory controller 155 or local memory controller 165 or both.

In some examples, device memory controller 155 and/or local memory controller 165 may include a sequencer to generate signal sequences for executing operations on the connected memory devices, as described in more detail with reference to FIG. 4.

The external memory controller 120 may be operable to enable communication of one or more of information, data, or commands between components of the system 100 or the host device 105 (e.g., the processor 125) and the memory device 110. The external memory controller 120 may convert or translate communications exchanged between the components of the host device 105 and the memory device 110. In some examples, the external memory controller 120 or other component of the system 100 or the host device 105, or its functions described herein, may be implemented by the processor 125. For example, the external memory controller 120 may be hardware, firmware, or software, or some combination thereof implemented by the processor 125 or other component of the system 100 or the host device 105. Although the external memory controller 120 is depicted as being external to the memory device 110, in some examples, the external memory controller 120, or its functions described herein, may be implemented by one or more components of a memory device 110 (e.g., a device memory controller 155, a local memory controller 165) or vice versa.

The components of the host device 105 may exchange information with the memory device 110 using one or more channels 115. The channels 115 may be operable to support communications between the external memory controller 120 and the memory device 110. Each channel 115 may be examples of transmission mediums that carry information between the host device 105 and the memory device. Each channel 115 may include one or more signal paths or transmission mediums (e.g., conductors) between terminals associated with the components of system 100. A signal path may be an example of a conductive path operable to carry a signal. For example, a channel 115 may include a first terminal including one or more pins or pads at the host device 105 and one or more pins or pads at the memory device 110. A pin or pad may be an example of a conductive input or output point of a device of the system 100, and a pin or pad may be operable to act as part of a channel.

Channels 115 (and associated signal paths and terminals) may be dedicated to communicating one or more types of information. For example, the channels 115 may include one or more command and address (CA) channels 186, one or more clock signal (CK) channels 188, one or more data (DQ) channels 190, one or more other channels 192, or a combination thereof. In some examples, signaling may be communicated over the channels 115 using single data rate (SDR) signaling or double data rate (DDR) signaling. In SDR signaling, one modulation symbol (e.g., signal level) of a signal may be registered for each clock cycle (e.g., on a rising or falling edge of a clock signal). In DDR signaling, two modulation symbols (e.g., signal levels) of a signal may be registered for each clock cycle (e.g., on both a rising edge and a falling edge of a clock signal).

In some examples, CA channels 186 may be operable to communicate commands between the host device 105 and the memory device 110 including control information associated with the commands (e.g., address information). For example, the CA channel 186 may include a read command with an address of the desired data. In some examples, a CA channel 186 may include any number of signal paths to decode one or more of address or command data (e.g., eight or nine signal paths).

In some examples, data channels 190 may be operable to communicate one or more of data or control information between the host device 105 and the memory device 110. For example, the data channels 190 may communicate information (e.g., bi-directional) to be written to the memory device 110 or information read from the memory device 110.

Figure 2:
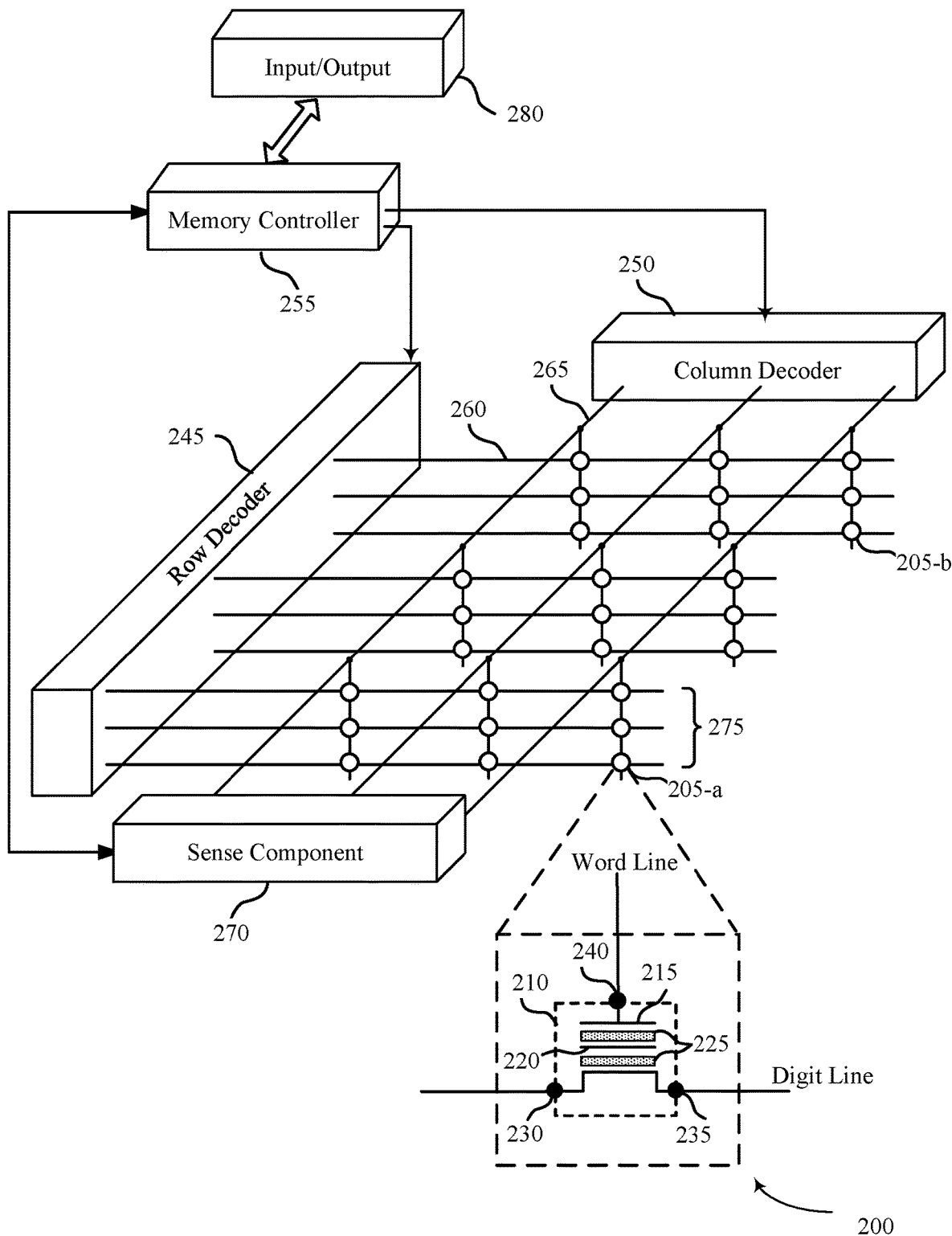
FIG. 2 illustrates an example of a memory device that supports a memory access gate in accordance with examples as disclosed herein.

FIG. 2 illustrates an example of a memory device 200 in accordance with examples as disclosed herein. In some cases, the memory device 200 may be referred to as a managed memory device, a memory chip, or an electronic memory apparatus. The memory device 200 may include one or more memory cells, such as memory cell 205-*a* and memory cell 205-*b* (other memory cells are unlabeled). A memory cell 205 may be, for example, a Flash memory cell (such as depicted in the blow-up diagram of memory cell 205-a shown in FIG. 2), a DRAM memory cell, an FeRAM memory cell, a PCM memory cell, or another type of memory cell.

Each memory cell 205 may be programmed to store a logic state representing one or more bits of information. Different memory cell architectures may store a logic state in different ways. In FeRAM architectures, for example, each memory cell 205 may include a capacitor that includes a ferroelectric material to store a charge and/or a polarization representative of the programmable state. In DRAM architectures, each memory cell 205 may include a capacitor that includes a dielectric material (e.g., an insulator) to store a charge representative of the programmable state. In Flash memory architectures, each memory cell 205 may include a transistor that has a floating gate and/or a dielectric material for storing a charge representative of the logic state. For example, the blow-up diagram of memory cell 205-a in FIG. 2 is a Flash memory cell that includes a transistor 210 (e.g., a metal-oxide-semiconductor (MOS) transistor) that may be used to store a logic state. The transistor 210 has a control gate 215 and may include a floating gate 220 that is sandwiched between dielectric material 225. Transistor 210 includes a first node 230 (e.g., a source or drain) and a second node 235 (e.g., a drain or source). A logic state may be stored in transistor 210 by placing (e.g., writing, storing) a quantity of electrons (e.g., a charge) on floating gate 220. The amount of charge to be stored on the floating gate 220 may depend on the logic state to be stored. The charge stored on floating gate 220 may affect the threshold voltage of transistor 210, thereby affecting the amount of current that may flow through transistor 210 when transistor 210 is activated. The logic state stored in transistor 210 may be read by applying a voltage to the control gate 215 (e.g., at control node 240) to activate transistor 210 and measuring (e.g., detecting, sensing) the resulting amount of current that flows between the first node 230 and the second node 235.

For example, a sense component 270 may determine a logic state stored on a Flash memory cell based on the presence or absence of a current from the memory cell, or based on whether the current is above or below a threshold current. Similarly, a Flash memory cell may be written by applying a voltage (e.g., a voltage above a threshold or a voltage below a threshold) to the memory cell to store (or not store) an electric charge on the floating gate representing one of the possible logic states.

A charge-trapping Flash memory cell may operate in a manner similar to that of a floating-gate Flash memory cell, but instead of (or in addition to) storing a charge on a floating gate 220, a charge-trapping Flash memory cell may store a charge representing the state in a dielectric material below the control gate 215. Thus, a charge-trapping Flash memory cell may or may not include a floating gate 220.

In some examples, each row of memory cells 205 is connected to a word line 260 and each column of memory cells 205 is connected to a digit line 265. Thus, one memory cell 205 may be located at the intersection of a word line 260 and a digit line 265. This intersection may be referred to as a memory cell's address. Digit lines are sometimes referred to as bit lines. In some cases, word lines 260 and digit lines 265 may be substantially perpendicular to one another and may create an array of memory cells 205, which may be an example of memory array 170 as described with reference to FIG. 1. In some cases, word lines 260 and digit lines 265 may be generically referred to as access lines or select lines.

In some cases, memory device 200 may include a three-dimensional (3D) memory array, where multiple two-dimensional (2D) memory arrays are formed on top of one another. This may increase the quantity of memory cells that may be placed or created on a single die or substrate as compared with 2D arrays, which in turn may reduce production costs, or increase the performance of the memory array, or both. In the example of FIG. 2, memory device 200 includes multiple levels of memory arrays. The levels may, in some examples, be separated by an electrically insulating material. Each level may be aligned or positioned so that memory cells 205 may be aligned (exactly, overlapping, or approximately) with one another across each level, forming memory cell stack 275. In some cases, memory cell stack 275 may be referred to as a string of memory cells, discussed in more detail with reference to FIG. 3.

Accessing memory cells 205 may be controlled through row decoder 245 and column decoder 250. For example, row decoder 245 may receive a row address from memory controller 255 and activate an appropriate word line 260 based on the received row address. Similarly, column decoder 250 may receive a column address from memory controller 255 and activate an appropriate digit line 265. Thus, by activating one word line 260 and one digit line 265, one memory cell 205 may be accessed.

Upon accessing, memory cell 205 may be read, or sensed, by sense component 270. For example, sense component 270 may be configured to determine the stored logic state of memory cell 205 based on a signal generated by accessing memory cell 205. The signal may include a voltage or electrical current, or both, and sense component 270 may include voltage sense amplifiers, current sense amplifiers, or both. For example, a current or voltage may be applied to a memory cell 205 (using the corresponding word line 260 and/or digit line 265) and the magnitude of the resulting current or voltage on the digit line 265 may depend on the logic state stored by the memory cell 205. For example, for a Flash memory cell, the amount of charge stored on a floating gate or in an insulating layer of a transistor in the memory cell 205 may affect the threshold voltage of the transistor, thereby affecting the amount of current that flows through the transistor in the memory cell 205 when the memory cell 205 is accessed. Such differences in current may be used to determine the logic state stored on the memory cell 205.

Sense component 270 may include various transistors or amplifiers in order to detect and amplify a signal (e.g., a current or voltage) on a digit line 265. The detected logic state of memory cell 205 may then be output via input/output block 280. In some cases, sense component 270 may be a part of column decoder 250 or row decoder 245, or sense component 270 may otherwise be connected to or in electronic communication with column decoder 250 or row decoder 245.

A memory cell 205 may be set or written by similarly activating the relevant word line 260 and digit line 265 to enable a logic state (e.g., representing one or more bits of information) to be stored in the memory cell 205. Column decoder 250 or row decoder 245 may accept data, for example from input/output block 280, to be written to the memory cells 205. As previously discussed, in the case of Flash memory (such as Flash memory used in NAND and 3D NAND memory devices) a memory cell 205 may be written by storing electrons in a floating gate or an insulating layer.

Memory controller 255 may control the operation (e.g., read, write, re-write, refresh) of memory cells 205 through the various components, for example, row decoder 245, column decoder 250, and sense component 270. In some cases, one or more of row decoder 245, column decoder 250, and sense component 270 may be co-located with memory controller 255. Memory controller 255 may generate row and column address signals in order to activate the desired word line 260 and digit line 265. Memory controller 255 may also generate and control various voltages or currents used during the operation of memory device 200.

Figure 3:
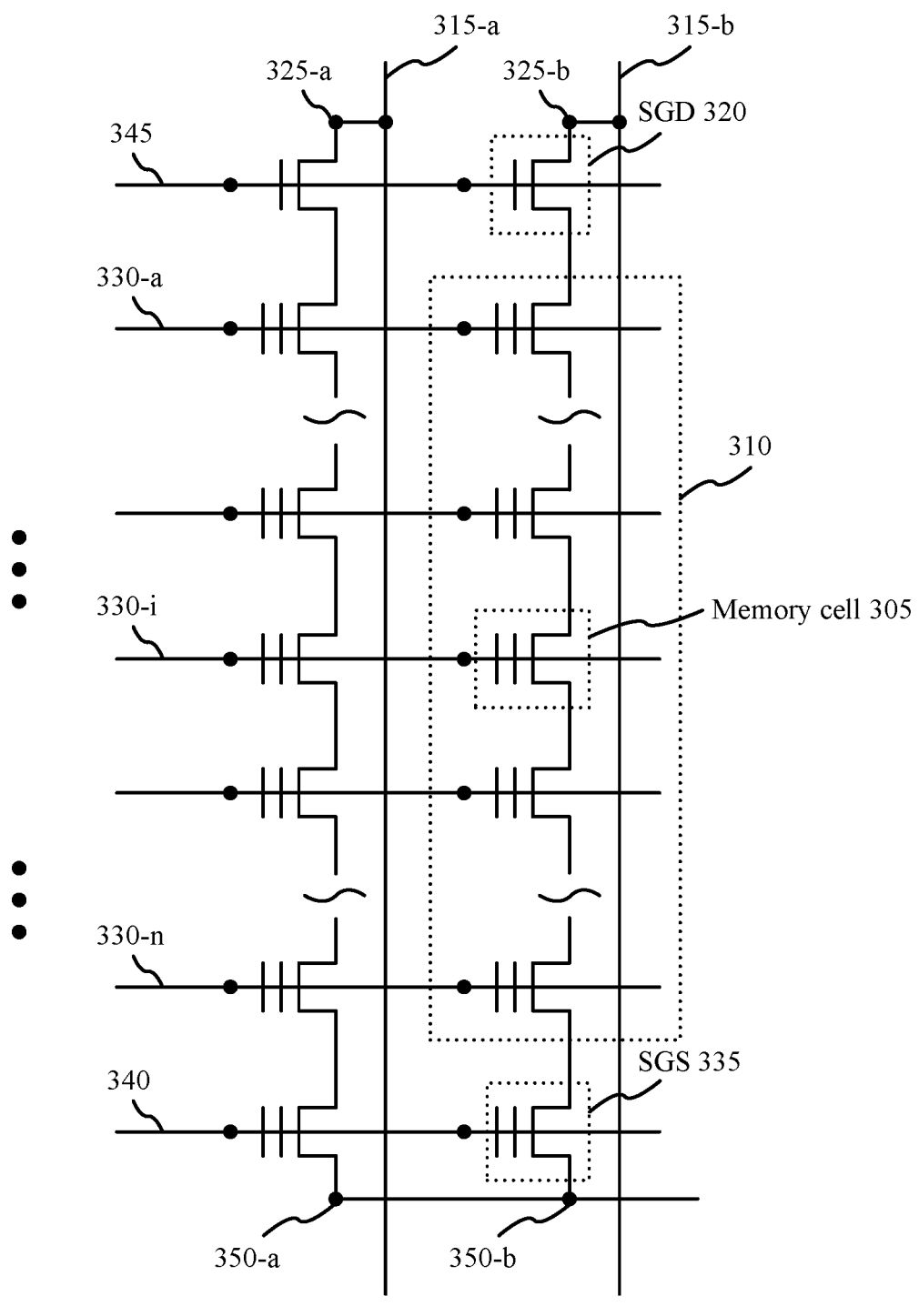
FIG. 3 illustrates an example of a NAND memory circuit that supports a memory access gate in accordance with examples as disclosed herein.

FIG. 3 illustrates an example of NAND memory circuit 300 that supports a memory access gate in accordance with examples of the present disclosure. NAND memory circuit 300 may be an example of a portion of a memory device, such as memory device 110 or memory device 200. Although some elements included in FIG. 3 are labeled with reference numbers, other corresponding elements are not labeled, though they are the same or would be understood to be similar, in an effort to increase visibility and clarity of the depicted features.

NAND memory circuit 300 includes multiple Flash memory cells 305 (which may be, for example, Flash memory cells such as described with reference to FIG. 2) connected in a NAND configuration. In a NAND memory configuration (referred to as NAND memory), multiple Flash memory cells 305 are connected in series with each other to form strings 310 of memory cells 305, in which the drain of each Flash memory cell 305 in the string 310 is coupled with the source of another Flash memory cell 305 in the string. In some cases, Flash memory cells that are connected in a NAND configuration to form a NAND memory may be referred to as NAND memory cells.

Each string 310 of memory cells 305 may be associated with a corresponding digit line 315 (e.g., digit line 315-a, 315-b) that is shared by the memory cells 305 in the string 310. Each memory cell 305 in a string 310 may be associated with a separate word line 330 (e.g., word line 330-a, 330-i, 330-n), such that the quantity of word lines 330 may be equal to the quantity of memory cells 305 in a string 310.

In general, NAND memory may be hierarchically organized as strings 310 that include multiple memory cells 305, pages that include multiple strings 310, and blocks that include multiple pages. In some cases, NAND memory can be written to and read from at the page level of granularity, but may not be erasable at the page level of granularity. For example, NAND memory may instead be erasable at a higher level of granularity, such as at the block level of granularity. In some cases, a NAND memory cell may need to be erased before it can be re-written. Different memory devices may have different read/write/erase characteristics.

Each string 310 of memory cells 305 in NAND memory circuit 300 is coupled with a select gate device for drain (SGD) transistor 320 at one end of the string 310 and a select gate device for source (SGS) transistor 335 at the other end of the string 310. SGD transistor 320 and SGS transistor 335 may be used to couple a string 310 of memory cells 305 to a digit line 315 and/or to a source node 350 (e.g., source node 350-a, 350-b) by applying a voltage at the gate 345 of SGD transistor 320 and/or at the gate 340 of SGS transistor 335, respectively.

During NAND memory operations, various voltage levels associated with source node 350, gate 340 of an SGS transistor 335 associated with source node 350, word lines 330, drain node 325, gate 345 of an SGD transistor 320 associated with drain node 325, and digit line 315 may be applied to perform one or more operations (e.g., program, erase, or read) on at least some NAND memory cells in a string 310.

In some cases, during a read operation, a positive voltage may be applied to digit line 315 connected to drain node 325 whereas source node 350 may be connected to a ground or a virtual ground (e.g., approximately 0 V). For example, the voltage applied to drain node 325 may be 1 V. Concurrently, voltages applied to gates 345 and 340 may be increased above the threshold voltages of the one or more SGSs 335 associated with source node 350 and the one or more SGDs 320 associated with drain node 325, such that a channel associated with memory string 310 may be electrically connected to drain node 325 and source node 350. A channel may be an electrical path through the memory cells 305 in a string 310 (e.g., through the transistors in the memory cells 305) that may conduct current under certain operating conditions.

Concurrently, multiple word lines 330 (e.g., word lines 330-a, 330-i, 330-n, or in some cases all word lines 330) except a selected word line (i.e., word lines associated with unselected cells in string 310) may be connected to a voltage (e.g., VREAD) that is higher than the highest threshold voltage (VT) of memory cells in string 310. VREAD may cause all of the unselected memory cells in string 310 to turn "ON" so that each unselected memory cell can maintain high conductivity in a channel associated with it. In some examples, a word line 330 associated with a selected cell may be connected to a voltage, VTarget. VTarget may be selected at a value between VT of an erased memory cell and VT of a programmed memory cell in memory string 310. When the selected memory cell exhibits an erased VT (e.g., VTarget>VT of the selected memory cell), the selected memory cell 305 may turn "ON" in response to the application of VTarget and thus allow a current to flow in the channel of memory string 310 from digit line 315 to source 350. When the selected memory cell exhibits a programmed VT (e.g., hence VTarget<VT of the selected memory cell), the selected memory cell may turn "OFF" in response to VTarget and thus prohibit a current to flow in the channel of memory string 310 from digit line 315 to source 350. The amount of current flow (or lack thereof), may be sensed by sense component 270 as described with reference to FIG. 2 to read stored information in the selected memory cell 305 within string 310.

Figure 4:
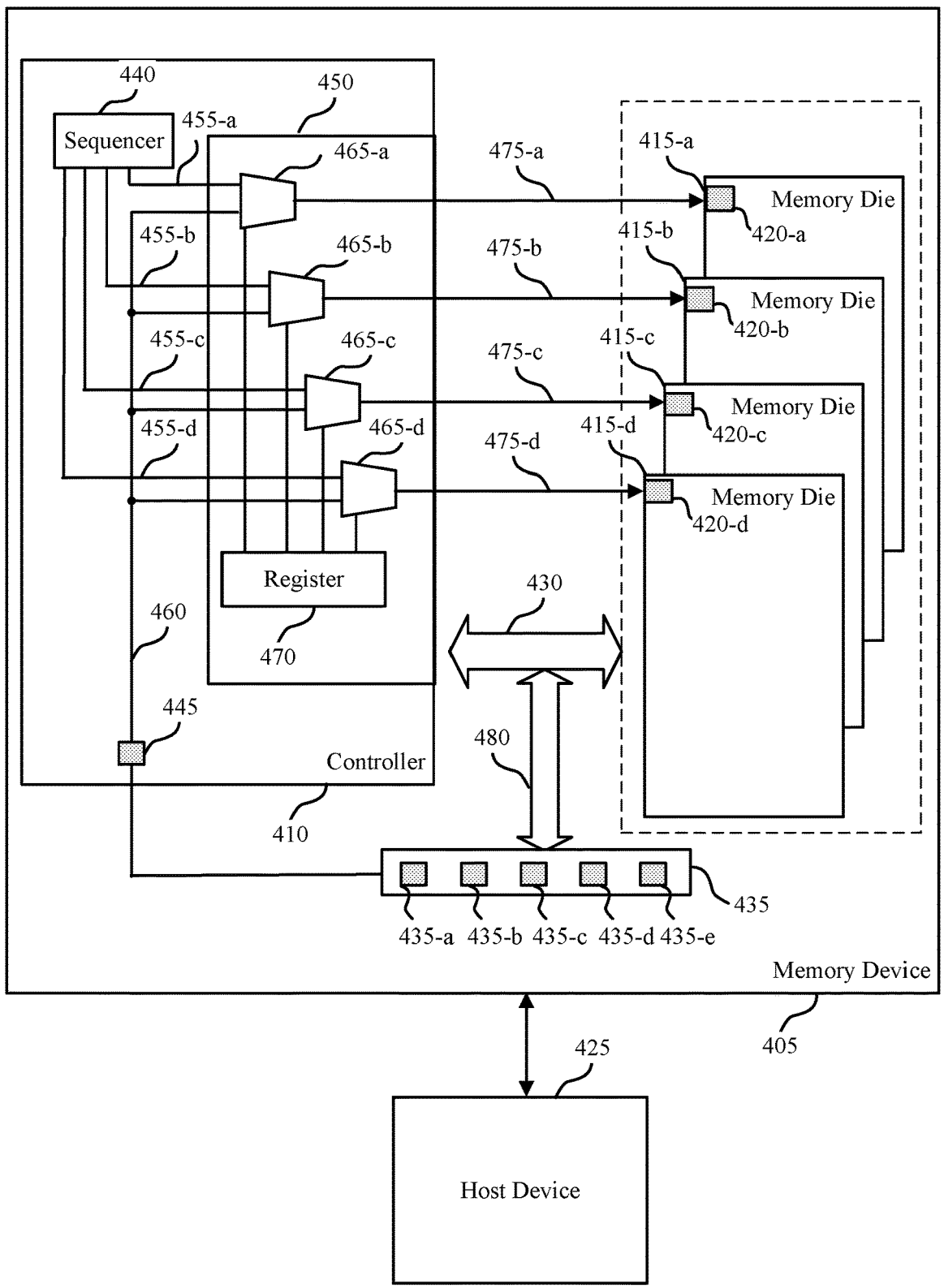
FIG. 4 illustrates an example of a system that supports a memory access gate in accordance with examples as disclosed herein.

FIG. 4 illustrates an example of a system 400 that supports a memory access gate in accordance with examples as disclosed herein. System 400 includes a memory device 405 (e.g., a managed memory device) that includes a controller 410 coupled with one or more memory die 415 (e.g., memory die 415-a, 415-b, 415-c, 415-d). Memory device 405 may be an example of memory device 110, 200 as described with reference to FIGS. 1 and 2, respectively. Controller 410 may be an example of a device memory controller 155, a local memory controller 165, or a combination of these. Controller 410 may be coupled with each memory die 415 via a respective conductive path 475 (e.g., 475-a, 475-b, 475-c, 475-c) and bus 430. In some examples, each memory die 415 may include one or more NAND memory arrays, such as described with reference to FIGS. 2 and 3, or another type of memory arrays.

During normal operation (e.g., when memory device 405 is operating in a normal operational mode), controller 410 may be configured to receive memory access commands from a host device 425, and based on the memory access commands, controller 410 may generate and provide various control signals, such as a chip enable signal, write enable signal, read enable signal, and/or other control signals, to respective inputs of a memory die 415 via one or more pads 420 (e.g., pad 420-a, 420-b, 420-c, 420-d) of the memory die 415. Such control signals may be used to select or activate memory die 415 for a memory access operation. A chip enable signal may be, for example, a signal that is used to activate or select a particular memory die 415 for a memory access operation, such as for a read operation or a write operation. In some cases, if a chip enable signal of a particular memory die 415 is not asserted (e.g., is inactive), the memory die 415 may maintain its outputs in a high impedance state to allow another memory die 415 (e.g., a selected memory die 415) to use a common bus, such as bus 430. In some cases, if the chip enable signal for a memory die 415 is not asserted, the unselected memory die 415 may be maintained in a low-power state.

A write enable signal may be, for example, a signal that is used to indicate to the memory die 415 that the controller 410 is or will be performing a write operation to the memory die 415. A read enable (or output enable) signal may be, for example, a signal that is used to indicate to the memory die 415 that the controller 410 is or will be performing a read operation to the memory die 415. In some cases, a single signal may function as a write enable signal or read enable signal depending on the polarity of the signal.

Controller 410 may provide a chip enable signal and either write enable signal or a read enable signal to a memory die 415 in response to receiving, for example, a write command or read command from a host device 425. In some cases, each memory die 415 may include multiple pads 420 for receiving a chip enable signal, write enable signal, and/or read enable signal; that is, each pad 420 of a memory die 415 may be associated with receiving a particular control signal. In some cases, a single pad 420 may be associated with receiving both a write enable signal and read enable signal.

Controller 410 may be configured to communicate data or other information with memory die 415 via bus 430. In some examples, bus 430 may be a bus having a standardized communication protocol, such as an Open NAND Flash Interface (ONFI) bus. Bus 430 may support parallel and/or serial transmission of multiple signals between memory die 415 and controller 410.

In some examples, controller 410 may include a sequencer 440. Sequencer 440 may be configured to optimize and reorder accesses to memory die 415 and improve performance. In some examples, sequencer 440 may generate a sequence of memory addresses for such memory accesses. In some examples, sequencer 440 may generate a chip enable signal, a write enable signal, a read enable signal, and/or other control signals based on receiving one or more memory access commands from host device 425, and may transmit one or more of these control signals to a memory die 415 via various conductive paths (e.g. conductive paths 455, 475).

In some cases, memory device 405 may, at various times, be operated in a diagnostic mode rather than in a normal operational mode. A diagnostic mode may be a mode in which the memory device 405 may be accessed or tested by an external device, such as host device 425, to detect errors or verify device behavior.

To support operation in a diagnostic mode, memory device 405 may include a set of one or more pads 435 (e.g., pads 435-a, 435-b, 4350c, 435-d, 435-e) that may be used to communicate signals with an external device, such as a host device 425, while memory device 405 is performing a procedure associated with being in the diagnostic mode, such performing a diagnostic procedure.

For example, bus 430 may be coupled with some or all pads in the set of pads 435 via bus 480. In this case, some or all of the signals on bus 430 may be routed to pads 435 to enable an external device, such as host device 425, to communicate (receive or transmit) signals on bus 430 when the memory device 405 is operating in a diagnostic mode. For example, host device 425 may, during a diagnostic procedure, provide inputs on one or more pads 435 and/or monitor outputs on one or more pads 435 to verify various operational aspects of memory device 405.

The set of pads 435 may include, for example, a pad 435-a for receiving an external chip enable signal or other control signal. In some cases, pad 435-a may be a HiZ pad that may be set to force the controller's buffer to a high impedance state to and avoid bus and control signal contention during diagnostic procedures. That is, pad 435-a may be used for either receiving an external chip enable signal or for causing the controller 410 to be bypassed. In some examples, the HiZ state of the controller 410 may be requested by the host device 425 issuing a command through a different combination and sequence of signals.

In some examples, pad 435-a may be a different pad than the HiZ pad.

Pad 435-a may be coupled with a corresponding pad 445 of controller 410, thereby providing a conductive path that enables an external device to provide a chip enable signal (or another control signal) to controller 410 via pad 435-a and pad 445.

Controller 410 may include a switching component 450 that may be configured to select either an externally provided control signal (e.g., received from an external device via pads 435-a and 445) or an internally generated control signal (e.g., generated by controller 410, such as by sequencer 440). In some examples, controller 410 may be operable to direct (e.g., provide, route) the selected control signal to memory die 415 using the switching component 450. Switching component 450 may provide the selected control signal to one or more memory die 415 to select or activate the memory die 415. Switching component 450 may be coupled with multiple first conductive paths 455 (e.g., paths 455-a, 455-b, 455-c, 455-d) for receiving internally generated control signals, with each first conductive path 455 corresponding to a particular memory die 415. Switching component 450 may be coupled with a second conductive path 460 for receiving an externally provided control signal. In some examples, controller 410 may be configured to determine whether memory device 405 is operating in a normal operational mode or in a diagnostic mode, and to switch, using switching component 450, between the first conductive path 455 and second conductive path 460 based on this determination. For example, controller 410 may determine whether memory device 405 has entered a diagnostic mode based on a value of a register 470 in controller 410, or based on a voltage value at a pad 445 of controller 410, or based on another criteria.

In some examples, switching component 450 includes multiple physical multiplexers 465 corresponding to the multiple memory die 415. Each multiplexer 465 may have a first input coupled with a first conductive path 455 and a second input coupled with a second conductive path 460. Each multiplexer 465 may have a control input that is coupled with a register 470. Multiplexer 465 may be configured to select conductive path 455 (e.g., corresponding to an internally generated chip enable signal) or conductive path 460 (e.g., corresponding to an externally provided chip enable signal) based on the contents of register 470. For example, register 470 may include multiple bits, each of which may be associated with a corresponding multiplexer 465. Depending on the value of the bit (0 or 1), the multiplexer 465 may select conductive path 460 or conductive path 455 for coupling with conductive path 475.

Each multiplexer 465 may then provide the selected chip enable signal (e.g., the internally generated chip enable signal or externally provided chip enable signal) to the corresponding memory die 415 via a respective conductive path 475. That is, each multiplexer 465 may be configured to couple either the first conductive path 455 or the second conductive path 460 with conductive path 475 based on the value stored in register 470. Conversely, each multiplexer 465 may be configured to isolate the unselected conductive path (conductive path 455 or conductive path 460) from conductive path 475 based on the value stored in register 470.

Each memory die 415, in turn, may be configured to receive the selected control signal from controller 410 via conductive path 475 and pad 420 and may be activated (e.g., selected, enabled) based on the received control signal.

In some cases, host device 425 may direct controller 410 to write a value to register 470 to control which conductive path is routed to a memory die 415, such as by transmitting a command to controller 410 that includes the value.

Register 470 may be a secure register, meaning that controller 410 may require authentication of host device 425 before writing a value provided by host device 425 to register 470. Such authentication may be based on a public key authentication approach, such based on the use of an RSA (Rivest-Shamir-Adleman) or DSA (digital signature algorithm) key, or based on another authentication technique. After authentication, controller 410 may write the value received from the host device 425 to register 470.

Although the example of FIG. 4 depicts the switching component 450 as being implemented using physical multiplexers (e.g., in hardware), switching component 450 may be implemented using other techniques without departing from the scope of the invention. For example, switching component 450 may be implemented in software, or using a combination of software and hardware. Such software may include firmware.

For example, controller 410 may be configured with firmware that causes controller 410 to poll the voltage value at pad 445 (e.g., determine or detect a voltage at pad 445 once, intermittently, or periodically) and mirror the voltage value at pad 445 on a corresponding conductive path 475 in order to provide a control signal to the appropriate memory die 415. In some cases, mirroring the voltage value detected at pad 445 on the corresponding conductive path 475 includes setting (e.g., driving) the voltage on the corresponding conductive path 475 to a voltage value that is substantially the same as the voltage value detected at pad 445, or to a voltage value that is substantially the same magnitude but opposite polarity as the voltage value at pad 445. In some cases, controller 410 may determine whether to minor the voltage at pad 445 on conductive path 475 based on the value of register 470. In some cases, controller 410 may disable conductive paths 455 when controller 410 mirrors the value at pad 445 on conductive path 475, such as by isolating conductive paths 455 from conductive paths 475.

Although the memory device shown in FIG. 4 includes a single pad 445 for receiving a control signal that may be used to control multiple memory dice 415, in some examples, a memory device may include separate pads for receiving separate control signals for each memory die. In this case, each multiplexer 465 may receive a separate control signal to enable independent control of each memory die 415.

Figure 5:
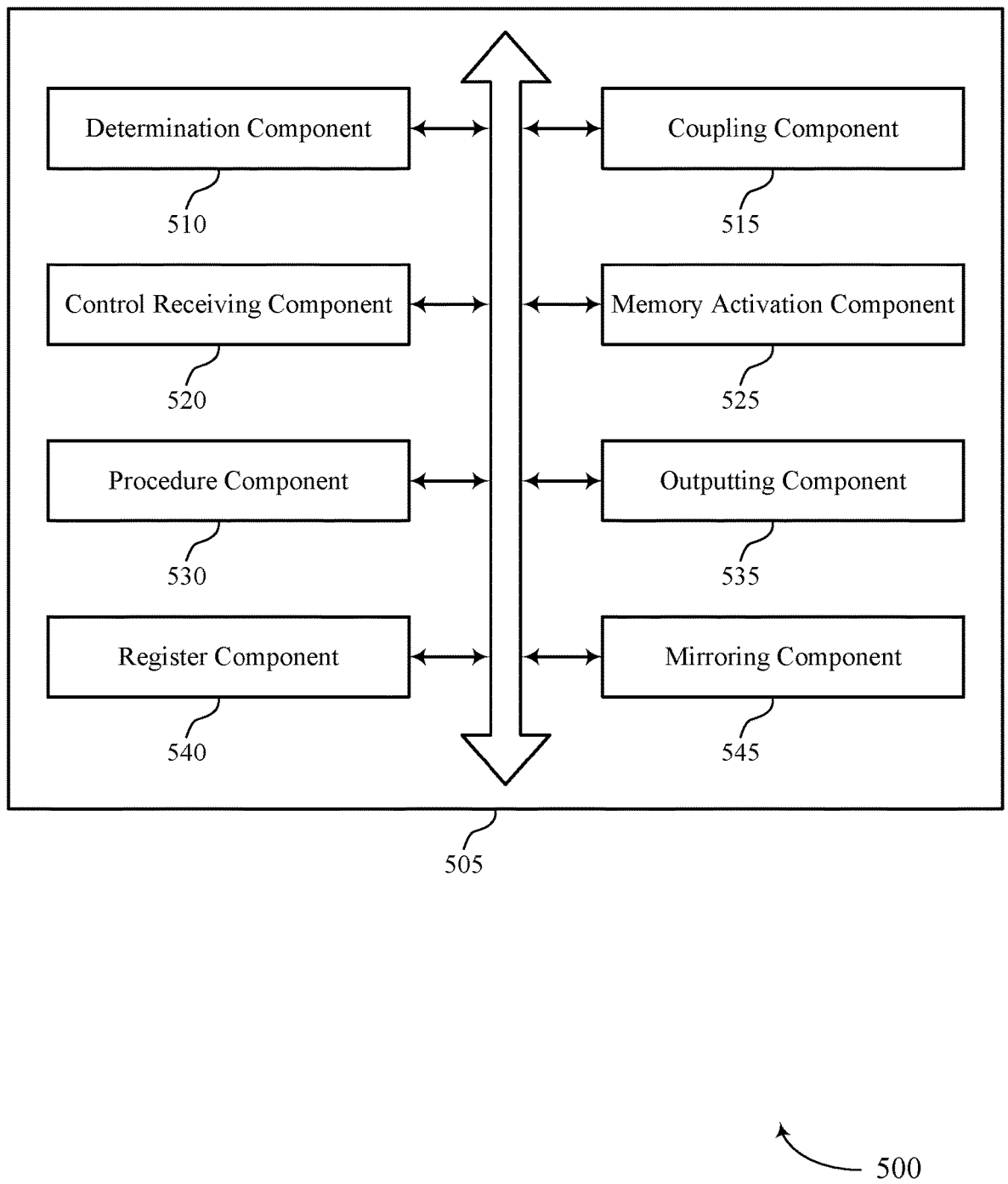
FIG. 5 shows a block diagram of a memory device that supports a memory access gate in accordance with aspects of the present disclosure.

FIG. 5 shows a block diagram 500 of a memory device 505 that supports a memory access gate in accordance with examples as disclosed herein. The memory device 505 may be an example of aspects of a memory device as described with reference to FIGS. 1 through 4. The memory device 505 may include a determination component 510, a coupling component 515, a control receiving component 520, a memory activation component 525, a procedure component 530, an outputting component 535, a register component 540, and a mirroring component 545. Each of these modules may communicate, directly or indirectly, with one another (e.g., via one or more buses).

The determination component 510 may determine, at a controller of the memory device, that the memory device has entered a first mode. In some examples, determining that the memory device has entered the first mode includes determining the value of a register.

The coupling component 515 may couple a first conductive path of the controller with an input of a memory die of the memory device based on determining that the memory device has entered the first mode. In some cases, the input of the memory die is a chip enable input.

In some examples, the coupling component 515 may isolate a second conductive path of the controller from the input of the memory die based on determining that the memory device has entered the first mode.

The control receiving component 520 may receive, via a first pad of the controller coupled with the first conductive path, a first control signal for activating the memory die. In some cases, the first control signal includes a chip enable signal.

In some examples, the determination component 510 may determine a first value at a first pad, and receiving the first control signal is based on determining the first value at the first pad.

In some cases, the second conductive path is associated with receiving a second chip enable signal from a sequencer of the controller.

The memory activation component 525 may activate the memory die based on receiving the first control signal.

The procedure component 530 may perform a procedure associated with the first mode on the memory device. In some examples, the procedure component 530 may receive a set of memory access signals from an external device via the one or more pads. In some examples, the procedure component 530 may perform one or more memory access operations on the memory device based on receiving the set of memory access signals. In some cases, the procedure includes a diagnostic procedure.

The outputting component 535 may output a result of the procedure to one or more pads different than the first pad.

The register component 540 may write a value to a register for selecting the first conductive path or the second conductive path. In some cases, the register is coupled with a control input of a multiplexer for selecting the first conductive path or the second conductive path for coupling the first conductive path or the second conductive path with the input of the memory die. In some examples, coupling the first conductive path with the input of the memory die is based on the value, and isolating the second conductive path from the input of the memory die is based on the value. In some examples, the register component may authenticate a host device and receive the value from the host device, where writing the value to the register may be based on authenticating the host device and receiving the value from the host device.

The mirroring component 545 may set the first conductive path to a second value based on determining the first value at the first pad. In some cases, the second value is substantially the same as the first value.

Figure 6:
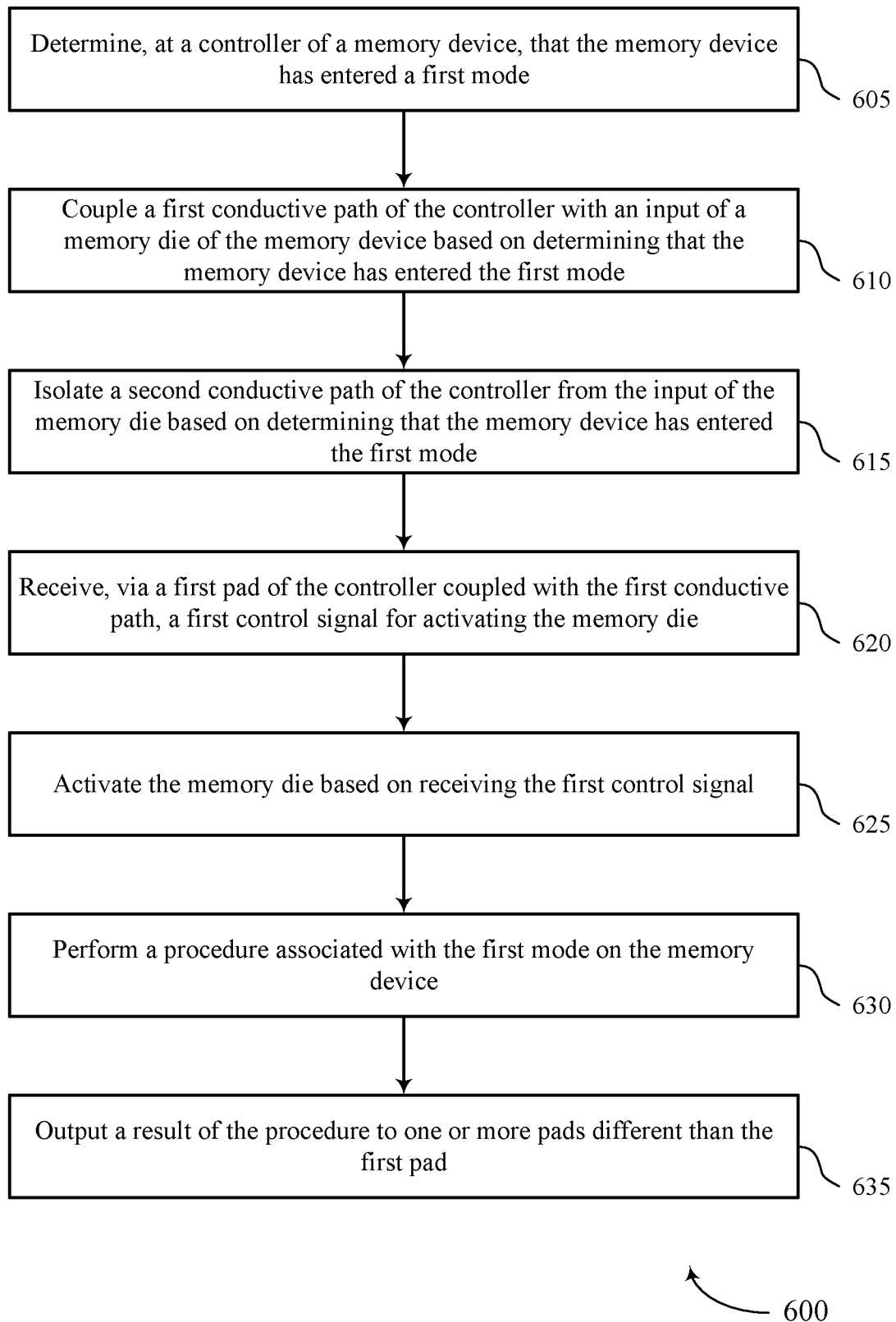
FIG. 6 shows a flowchart illustrating a method or methods that support a memory access gate in accordance with examples as disclosed herein.

FIG. 6 shows a flowchart illustrating a method or methods 600 that supports a memory access gate in accordance with aspects of the present disclosure. The operations of method 600 may be implemented by a memory device or its components as described herein. For example, the operations of method 600 may be performed by a memory device as described with reference to FIG. 5. In some examples, a memory device or a portion of a memory device may execute a set of instructions to control the functional elements of the memory device to perform the described functions. Additionally or alternatively, a memory device may perform aspects of the described functions using special-purpose hardware.

At 605, the memory device may determine, at a controller of the memory device, that the memory device has entered a first mode. The operations of 605 may be performed according to the methods described herein. In some examples, aspects of the operations of 605 may be performed by a determination component as described with reference to FIG. 5.

At 610, the memory device may couple a first conductive path of the controller with an input of a memory die of the memory device based on determining that the memory device has entered the first mode. The operations of 610 may be performed according to the methods described herein. In some examples, aspects of the operations of 610 may be performed by a coupling component as described with reference to FIG. 5.

At 615, the memory device may isolate a second conductive path of the controller from the input of the memory die based on determining that the memory device has entered the first mode. The operations of 615 may be performed according to the methods described herein. In some examples, aspects of the operations of 615 may be performed by a coupling component as described with reference to FIG. 5.

At 620, the memory device may receive, via a first pad of the controller coupled with the first conductive path, a first control signal for activating the memory die. The operations of 620 may be performed according to the methods described herein. In some examples, aspects of the operations of 620 may be performed by a control receiving component as described with reference to FIG. 5.

At 625, the memory device may activate the memory die based on receiving the first control signal. The operations of 625 may be performed according to the methods described herein. In some examples, aspects of the operations of 625 may be performed by a memory activation component as described with reference to FIG. 5.

At 630, the memory device may perform a procedure associated with the first mode on the memory device. The operations of 630 may be performed according to the methods described herein. In some examples, aspects of the operations of 630 may be performed by a procedure component as described with reference to FIG. 5.

At 635, the memory device may output a result of the procedure to one or more pads different than the first pad. The operations of 635 may be performed according to the methods described herein. In some examples, aspects of the operations of 635 may be performed by an outputting component as described with reference to FIG. 5.

In some examples, an apparatus as described herein may perform a method or methods, such as the method 600. The apparatus may include features, means, or instructions (e.g., a non-transitory computer-readable medium storing instructions executable by a processor) for determining, at a controller of a memory device, that a memory device has entered a first mode, coupling a first conductive path of the controller with an input of a memory die of the memory device based on determining that the memory device has entered the first mode, isolating a second conductive path of the controller from the input of the memory die based on determining that the memory device has entered the first mode, receiving, via a first pad of the controller coupled with the first conductive path, a first control signal for activating the memory die, activating the memory die based on receiving the first control signal, performing a procedure associated with the first mode on the memory device, and outputting a result of the procedure to one or more pads different than the first pad.

Some examples of the method 600 and the apparatus described herein may further include operations, features, means, or instructions for writing a value to a register for selecting the first conductive path or the second conductive path, and where coupling the first conductive path with the input of the memory die may be based on the value, and isolating the second conductive path from the input of the memory die may be based on the value.

Some examples of the method 600 and the apparatus described herein may further include operations, features, means, or instructions for authenticating a host device and receiving the value from the host device, where writing the value to the register may be based on authenticating the host device and receiving the value from the host device.

In some examples of the method 600 and the apparatus described herein, the register may be coupled with a control input of a multiplexer for selecting the first conductive path or the second conductive path for coupling the first conductive path or the second conductive path with the input of the memory die.

In some examples of the method 600 and the apparatus described herein, determining that the memory device may have entered the first mode may include operations, features, means, or instructions for determining the value of the register.

Some examples of the method 600 and the apparatus described herein may further include operations, features, means, or instructions for determining a first value at the first pad, where receiving the first control signal may be based on determining the first value at the first pad, and setting the first conductive path to a second value based on determining the first value at the first pad. In some examples of the method 600 and the apparatus described herein, the second value may be substantially the same as the first value.

In some examples of the method 600 and the apparatus described herein, performing the procedure may include operations, features, means, or instructions for receiving a set of memory access signals from an external device via the one or more pads, and performing one or more memory access operations on the memory die based on receiving the set of memory access signals.

In some examples of the method 600 and the apparatus described herein, the procedure includes a diagnostic procedure.

In some examples of the method 600 and the apparatus described herein, the input of the memory die may be a chip enable input.

In some examples of the method 600 and the apparatus described herein, the first control signal includes a chip enable signal.

In some examples of the method 600 and the apparatus described herein, the second conductive path may be associated with receiving a second chip enable signal from a sequencer of the controller.

It should be noted that the methods described above describe possible implementations, and that the operations and the steps may be rearranged or otherwise modified and that other implementations are possible. Furthermore, portions from two or more of the methods may be combined.

An apparatus is described. The apparatus may include a memory die and a controller coupled with the memory die, the controller including a pad for receiving a first control signal for activating the memory die, a first conductive path coupled with the pad, a second conductive path for receiving, from a sequencer of the controller, a second control signal for activating the memory die, and a switching component coupled with the first conductive path and the second conductive path and configured to select the first conductive path or the second conductive path for coupling with the memory die, wherein the controller is operable to direct the first control signal or the second control signal to the memory die using the switching component.

In some examples, the switching component includes a multiplexer having a first input coupled with the first conductive path, a second input coupled with the second conductive path, and an output configured to be coupled with the memory die.

In some examples, a value stored in a register indicates, to the multiplexer, whether to select the first conductive path or the second conductive path.

In some examples, the switching component may be implemented in software.

In some examples, a chip enable input of the memory die may be coupled with an output of the switching component.

Some examples of the apparatus may include a bus coupled between the memory die and the controller, the bus configured to communicate data between the memory die and the controller, and a set of pads coupled with the bus and configured to communicate signals with the memory device during a diagnostic procedure.

In some examples, the controller includes a second pad configured to receive an indication that the memory die may be in a first mode associated with the diagnostic procedure.

An apparatus is described. The apparatus may include a controller including a first conductive path for receiving a first control signal and a second conductive path for receiving a second control signal, a memory die coupled with the controller and configured to be activated based on the memory die receiving the first control signal or the second control signal, where the controller is operable to receive, via the first conductive path, the first control signal, couple the first conductive path with the memory die to transmit the first control signal to the memory die based on receiving the first control signal, and isolate the second conductive path from the memory die based on the controller receiving the first control signal.

In some examples, the controller may include a multiplexer coupled with the first conductive path, the second conductive path, and the memory die and configured to select the first conductive path or the second conductive path for coupling with the memory die, and a register coupled with the multiplexer, where a value stored in the register indicates, to the multiplexer, whether to select the first conductive path or the second conductive path.

In some examples, a host device may be coupled with the controller and configured to provide the value to the controller.

In some examples, the apparatus includes a bus coupled between the memory die and the controller, the bus configured to communicate data between the memory device and the controller during memory access operations, and a set of pads coupled with the bus and configured to communicate signals with the memory device during a diagnostic procedure of the memory device.

In some examples, the first control signal includes a first chip enable signal, and where the second conductive path may be associated with a second chip enable signal received from a sequencer associated with the memory device.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, it will be understood by a person of ordinary skill in the art that the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to condition of moving from an open-circuit relationship between components in which signals are not presently capable of being communicated between the components over a conductive path to a closed-circuit relationship between components in which signals are capable of being communicated between components over the conductive path. When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

As used herein, the term "substantially" means that the modified characteristic (e.g., a verb or adjective modified by the term substantially) need not be absolute but is close enough to achieve the advantages of the characteristic.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are signals), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A non-transitory computer-readable medium storing code comprising instructions which, when executed by a processor of an electronic device, cause the electronic device to:
    isolate a first conductive path of a controller of the electronic device from an input of a memory die of the electronic device;
    couple a second conductive path of the controller with the input of the memory die based at least in part on isolating the first conductive path from the input;
    receive, from the controller coupled with the second conductive path, a signal for activating the memory die; and
    activate the memory die based at least in part on receiving the signal.

2. The non-transitory computer-readable medium of claim 1, wherein the instructions, when executed by the processor of the electronic device, further cause the electronic device to:
  determine, at the controller, whether the electronic device is operating in a first mode associated with a diagnostic procedure or a second mode associated with executing one or more access commands, wherein isolating the first conductive path and coupling the second conductive path are based at least in part on determining that the electronic device is operating in the second mode.

3. The non-transitory computer-readable medium of claim 2, wherein the instructions, when executed by the processor of the electronic device, further cause the electronic device to:
  determine a value of a register, wherein determining that the electronic device is operating in the second mode is based at least in part on determining the value of the register.

4. The non-transitory computer-readable medium of claim 1, wherein the instructions, when executed by the processor of the electronic device, further cause the electronic device to:
  receive an access command for the memory die, wherein receiving the signal from is based at least in part on receiving the access command for the memory die.

5. The non-transitory computer-readable medium of claim 4, wherein the instructions, when executed by the processor of the electronic device, further cause the electronic device to:
  generate, by the controller, the signal, wherein receiving the signal is based at least in part on the generating.

6. The non-transitory computer-readable medium of claim 1, wherein the instructions, when executed by the processor of the electronic device, further cause the electronic device to:
  write a value to a register for selecting the first conductive path or the second conductive path, wherein isolating the first conductive path and coupling the second conductive path are based at least in part on the value.

7. The non-transitory computer-readable medium of claim 6, wherein the instructions, when executed by the processor of the electronic device, further cause the electronic device to:
  authenticate a host device; and
  receive the value from the host device, wherein writing the value to the register is based at least in part on authenticating the host device and receiving the value from the host device.

8. The non-transitory computer-readable medium of claim 1, wherein the first conductive path is associated with receiving a second signal from a pad of the controller.

9. The non-transitory computer-readable medium of claim 1, wherein the input of the memory die is a chip enable input.

10. The non-transitory computer-readable medium of claim 1, wherein the signal comprises a chip enable signal.

11. An apparatus, comprising:
  a memory die; and
  a controller coupled with the memory die, the controller comprising:
    a first conductive path for receiving a first signal for activating the memory die;
    a second conductive path for receiving a second signal for activating the memory die; and
    a switching component coupled with the first conductive path and the second conductive path and configured to couple one of the first conductive path or the second conductive path with the memory die, wherein the controller is operable to direct the first signal or the second signal to the memory die.

12. The apparatus of claim 11, wherein the first conductive path couples a pad of the controller with the switching component.

13. The apparatus of claim 11, wherein the second conductive path couples a sequencer of the controller with the switching component.

14. The apparatus of claim 11, wherein the switching component comprises:
  a first input coupled with the first conductive path;
  a second input coupled with the second conductive path; and
  an output configured to be coupled with the memory die.

15. The apparatus of claim 14, further comprising:
  a register coupled with a control input of the switching component, wherein a value stored in the register indicates, to the switching component, whether to select the first conductive path or the second conductive path.

16. The apparatus of claim 11, wherein a chip enable input of the memory die is coupled with an output of the switching component.

17. A system, comprising:
  a controller comprising a first conductive path for receiving a first signal and a second conductive path for receiving a second signal, and
  a memory die coupled with the controller and configured to be activated based at least in part on the memory die receiving the first signal or the second signal,
  wherein the controller is operable to:
  select to transmit the first signal or the second signal to the memory die;
  couple the first conductive path with the memory die based at least in part on selecting to transmit the first signal; and
  isolate the second conductive path from the memory die based at least in part on selecting to transmit the first signal.

18. The system of claim 17, wherein the controller further comprises:
  a switching component coupled with the first conductive path, the second conductive path, and the memory die, wherein the switching component is configured to select the first conductive path or the second conductive path for coupling with the memory die; and
  a register coupled with the switching component, wherein a value stored in the register indicates, to the switching component, whether to select the first conductive path or the second conductive path.

19. The system of claim 18, wherein the first conductive path couples a sequencer of the controller with the switching component.

20. The system of claim 18, wherein the second conductive path couples a pad of the controller with the switching component.

* * * * *